Sept. 8, 1953 O. D. DUKE 2,651,291
STOCK FEEDER
Filed Nov. 14, 1947 2 Sheets-Sheet 1
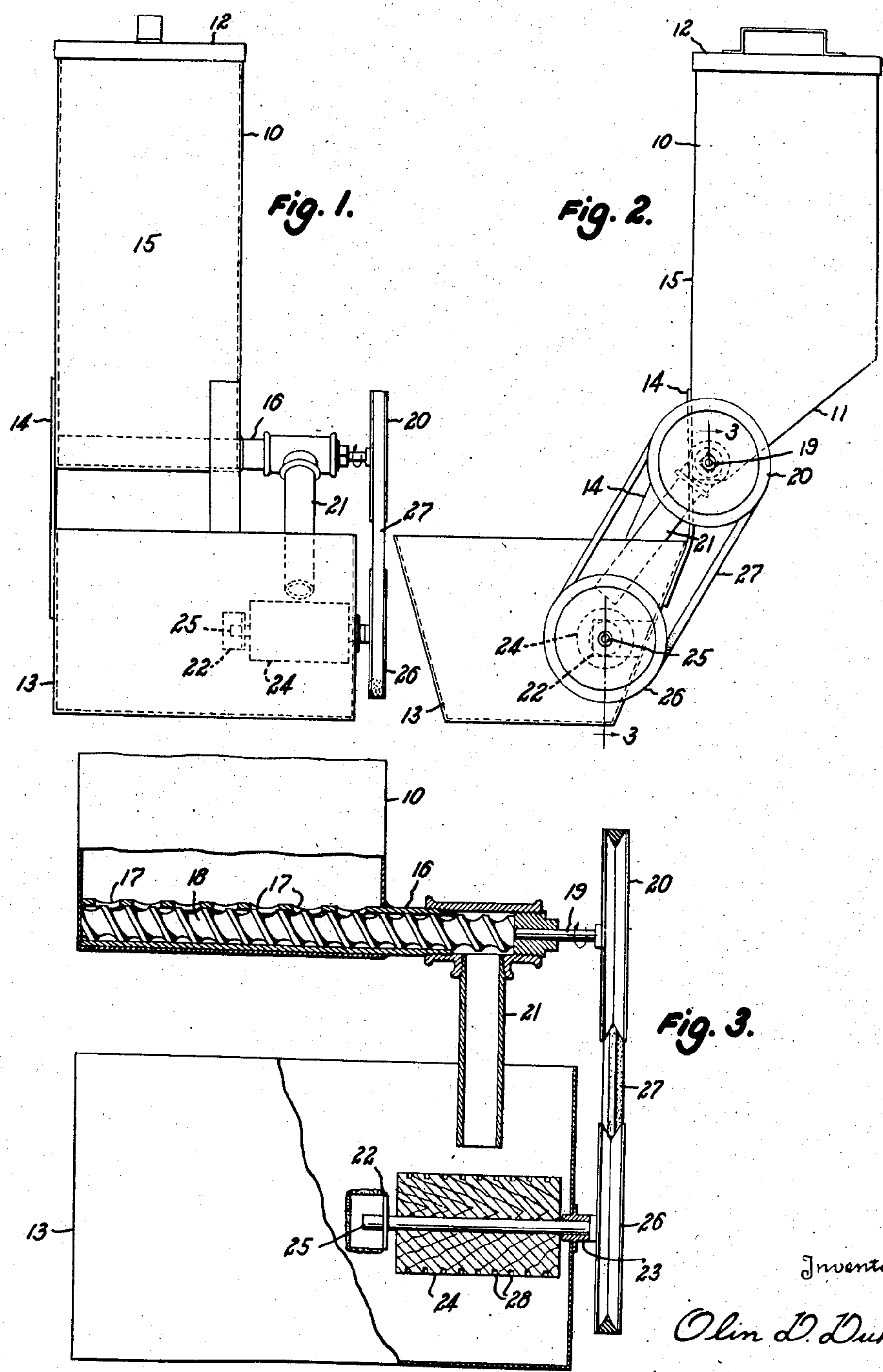
Inventor
Olin D. Duke
By Stowell & Evans
Attorneys.

Sept. 8, 1953 O. D. DUKE 2,651,291
STOCK FEEDER
Filed Nov. 14, 1947 2 Sheets-Sheet 2
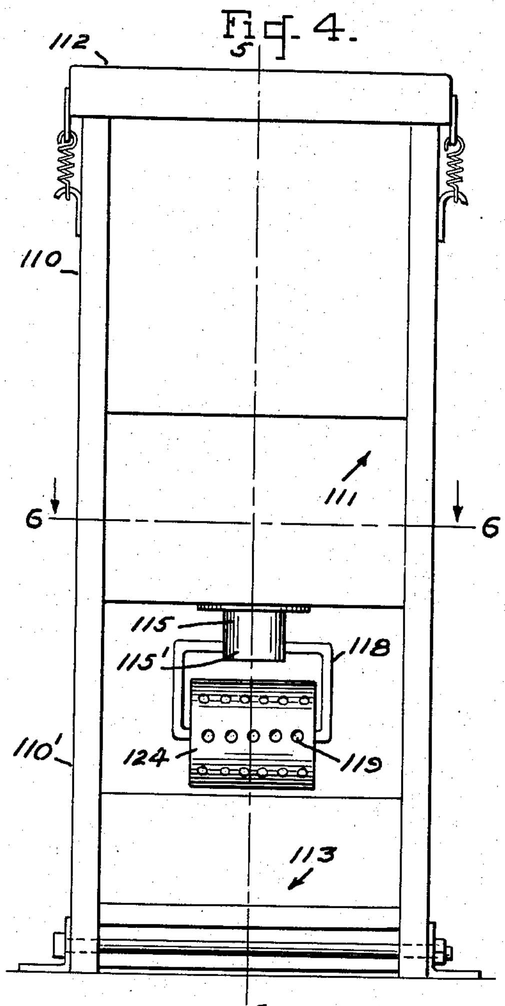
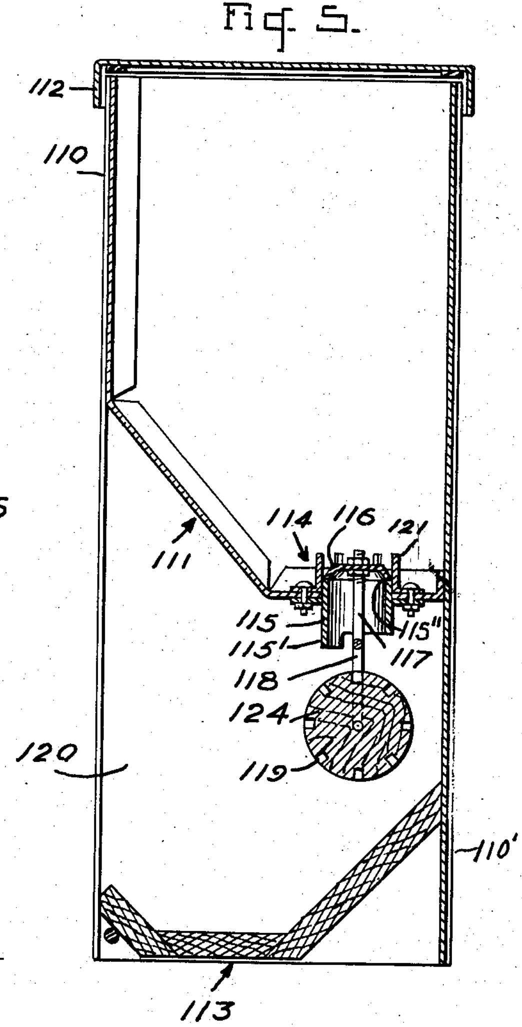
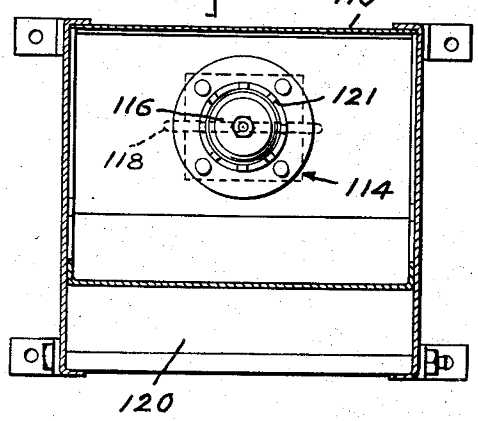
INVENTOR.
Olin D. Duke
BY
Stowell + Evans
Attorneys Patented Sept. 8, 1953

2,651,291

UNITED STATES PATENT OFFICE 2,651,291

STOCK FEEDER

Olin D. Duke, Guymon, Okla.

Application November 14, 1947, Serial No. 786,120

3 Claims. (Cl. 119—54)

1

This invention relates to stock feeders, more particularly to stock feeders operated by the animals themselves, and is specifically concerned with feeders wherein operating power is supplied by the animals in licking a baited element of the feeder.

An object of the invention is to provide an improved device for feeding granular feed, particularly salt or other minerals, to stock. The feeder, being animal operated, requires a minimum of attention and service and protects the supply of salt from injury by the elements and from damage by the stock prior to its consumption. Another object is to provide a stock feeder that is economical to manufacture and simple to maintain. Other objects and advantages of the feeder will appear in the following description.

Typically, the device of the invention is a tongue-driven stock feeder including a container for feed, a tongue-driven element remote from the feed in the container, means actuated by the tongue-driven element for dispensing feed from the container, and means for directing dispensed feed upon the tongue-driven element.

The invention will be more particularly described with reference to the illustrative embodiments of the invention shown in the accompanying drawings, in which:

Fig. 1 is a front elevation of a stock feeder;

Fig. 2 is a right side elevation of the feeder in Fig. 1;

Fig. 3 is a fragmentary sectional view taken along the line 3—3 of Fig. 2;

Fig. 4 is a front elevation of a modified form of the stock feeder of the invention;

Fig. 5 is a section on line 5—5 of Fig. 4;

Fig. 6 is a section on line 6—6 of Fig. 4.

In the drawing, Figs. 1 to 3, the stock feeder shown has a hopper 10 including a forwardly and downwardly sloping bottom 11 and a removable cover 12. The hopper may be made of sheet metal and is adapted to contain a supply of granular salt or the like and designed to protect the salt from the weather. A pan or receiver 13 is secured by a bracket 14 to the hopper and is arranged to receive salt from the hopper and to act as a feeding trough, for which purpose the top of the trough is open.

At the lowest point of the hopper in the angle between the front wall 15 and the bottom 11 thereof, there is positioned a device for dispensing salt from the hopper and conducting it to the feeding trough. This device takes the form of a screw conveyor having a tube 16 provided with a plurality of holes 17 for the ad-

2 mission of salt from the hopper. A screw 18 is rotatably carried in the tube and has a driving extension 19 extending from the right-hand bushed end of the tube. A sheave 20 is affixed to the end of the extension 19. A downwardly sloping pipe nipple 21 conducts mineral from the tube 16 to the pan 13.

Mounted within the pan 13 between a bearing bracket 22 and a bearing 23 located in the right-hand side wall of the pan there is a rotatable cylinder 24. The cylinder is fixed to a shaft 25 that carries a sheave 26, and a belt 27 drivingly connects the sheave 26 and the sheave 20. The cylinder 24 is preferably made of wood and is provided with a number of drilled pockets 28 in its surface for a purpose which will become apparent as the description proceeds.

It will be noted that the pipe nipple or conduit 21 has its lower outlet end positioned directly above the cylinder 24 so that salt or other feed discharged from the end of the pipe will fall upon the cylinder.

In operation, a supply of granular salt is charged into the hopper 10. Cattle for which the salt is intended are attracted to the feeder and, particularly if the feeder has been in use or the cylinder or roller 24 has been baited by rubbing it with moist salt, the cattle will lick the roller causing it to rotate in a clockwise direction as seen in Fig. 2 and to drive the screw 18 in the sense of the arrow of Fig. 3 through the belt drive hereinbefore described. The turning of the screw 18 draws salt from the hopper 10 and dispenses it down the pipe 21 and onto the roller 24. Moisture from the tongues of the cattle is deposited on the roller and in the pockets 28 thereof causing some salt to stock on the surface of the roller and in the pockets, thus maintaining the roller in a baited condition. Excess salt falls into the receiving pan 13 from which it may be eaten by the stock. When the pan is empty, the stock, if in need of salt, will be induced to lick the roller and thus obtain additional salt.

A modification of the stock feeder of the invention wherein the feed dispensing means includes a rocking valve is illustrated in Figs. 4 to 6.

The feeder has two sections. The upper section 110 consists of a hopper with a rearwardly and downwardly sloping floor section 111, and a removable cover 112 for charging the hopper. The lower section 110′ is provided with a feeding opening 120 and a trough-like floor 113 to receive salt from the hopper.

At the lowest point of the hopper floor 111 there is a rocking valve 114 for dispensing feed from the hopper. This valve is constructed with a rigidly mounted dispensing conduit 115, the upper end of which forms a valve seat 115'' for the rocking disk 116. Members 121 project upwardly from the hopper floor 111 to provide lateral stops or guides for the disk 116. Attached to disk 116 is the valve actuating arm 117. This arm projects downwardly through the dispensing conduit. At its lower end yoke bar 118 is rigidly attached to the arm. Roller 124 is rotatably mounted in the lower ends of yoke 118. Conduit extension 115' provides stops engaging the cross-members of the yoke to limit the forward rocking and to substantially prevent rotation of the valve actuating arm 117. The upward and backward motion of arm 117 is limited by the lower end of the rearward portion of conduit 115. Roller 124 is provided with feed catching pockets 119 on its surface.

In operation, a supply of granular feedstuff, for example salt, is placed in the hopper 110 and the roller 124 may be baited by rubbing moist salt into its surface pockets 119. Cattle seeking salt are attracted to the baited roller and lick this cylinder causing it to rotate and rock. The rocking lifts rocking disk 116 from its seat and salt from the hopper flows through conduit 115 on to the surface of the roller, rebaiting it. Excess salt is caught on the trough-like floor 113 where it can be consumed by the cattle. When this trough becomes empty, the stock will be induced by the material still retained on the roller to lick the roller and thus obtain additional salt.

It will be seen that the tongue-driven rollers 24 and 124 are remote from and never touch the salt in the hopper; hence, the salt is not contaminated by animal saliva and remains dry and free-running at all times thus insuring continuous and reliable operation of the feeder. It will also be apparent that the discharge of salt upon the rollers and the ability of the rollers to retain salt upon their surfaces and in the indentations thereof insures that the rollers will remain baited and that the stock will be induced to actuate the device whenever necessary.

From the foregoing description of the invention, those skilled in the art will be enabled to construct a variety of modifications within the scope of the invention. For example, other equivalent mechanisms can be used in place of the screw conveyor or the rocking valve for transferring feed from the hopper to the receiving pan as long as the tongue-driven roller does not come in contact with the salt in the hopper.

This application is a continuation-in-part of my copending application Ser. No. 697,236, filed September 16, 1946 for Stock Feeder, and now abandoned.

I claim:

1. A tongue-driven stock feeder comprising a hopper for granular minerals, a tongue-driven roller having mineral retaining pockets formed in its surface positioned beneath said hopper and free from direct contact with the feed in said hopper, a valve in the bottom of said hopper, actuated by rocking said roller for dispensing minerals from the bottom of said hopper and a condition for directing the dispensed minerals to and in contact with said roller.

2. A tongue-driven stock feeder comprising a hopper for granular minerals, a valve seat rigidly mounted in the bottom of said hopper, a rocking valve disk on said seat, a valve rod attached to said disk and projecting therefrom, a tongue-driven roller having mineral retaining pockets formed in its surface rotatably carried by the lower end of said rod, whereby movement of said roller actuates said valve disk to dispense minerals from said hopper, a conduit for directing the dispensed minerals to and in contact with said roller, and a trough positioned to receive excess minerals from said roller.

3. A tongue-driven stock feeder comprising a hopper for granular feed, a dispensing valve at the bottom of said hopper, a valve actuating rod extending from said valve downwardly from said hopper, a tongue-driven roller carried by the lower end of said rod and positioned beneath said valve, and a trough positioned to receive excess feed from said roller.

OLIN D. DUKE.

References Cited in the file of this patent

UNITED STATES PATENTS

| Number | Name | Date |
|---|---|---|
| 322,378 | Johnson | July 14, 1885 |
| 338,761 | Milliken | Mar. 30, 1886 |
| 349,843 | Gushart | Sept. 28, 1886 |
| 368,161 | Nichols | Aug. 9, 1887 |
| 586,148 | Tobias | July 13, 1897 |
| 1,268,869 | Morrow | June 11, 1918 |
| 1,276,884 | Dierks | Aug. 27, 1918 |
| 1,305,832 | Patterson | June 3, 1919 |
| 2,293,643 | Evans | Aug. 18, 1942 |

FOREIGN PATENTS

| Number | Country | Date |
|---|---|---|
| 214,128 | Great Britain | Apr. 17, 1924 |